(12) United States Patent
Carneal et al.

(10) Patent No.: US 6,463,070 B1
(45) Date of Patent: Oct. 8, 2002

(54) SYSTEM AND METHOD FOR CLOCK CORRELATED DATA FLOW IN A MULTI-PROCESSOR COMMUNICATION SYSTEM

(75) Inventors: Bruce L. Carneal, Del Mar; Christopher M. Lee, San Diego, both of CA (US)

(73) Assignee: Tachyon, Inc., San Diego, CA (US)

( * ) Notice: Subject to any disclaimer, the term of this patent is extended or adjusted under 35 U.S.C. 154(b) by 0 days.

(21) Appl. No.: 09/407,588

(22) Filed: Sep. 28, 1999

Related U.S. Application Data (60) Provisional application No. 60/151,282, filed on Aug. 27, 1999.

(51) Int. Cl.[7] .............................................. H04L 12/54
(52) U.S. Cl. .................................................... 370/428
(58) Field of Search .......................... 370/428, 321–336, 370/442, 436, 477; 725/106, 126; 375/347, 144, 335, 367; 348/262, 588, 237, 572, 317, 700–715, 135–137, 152–155

(56) References Cited

U.S. PATENT DOCUMENTS

| | | | |
|---|---|---|---|
| 3,611,435 A | | 10/1971 | Cooper |
| 3,818,453 A | | 6/1974 | Schmidt et al. |
| 4,543,574 A | | 9/1985 | Takagi et al. |
| 4,545,061 A | | 10/1985 | Hileman |
| 4,555,782 A | | 11/1985 | Alaria et al. |
| 4,736,371 A | | 4/1988 | Tejima et al. |
| 4,763,325 A | | 8/1988 | Wolfe et al. |
| 4,774,707 A | | 9/1988 | Raychaudhuri |
| 4,811,200 A | | 3/1989 | Wagner et al. |
| 4,837,786 A | | 6/1989 | Gurantz et al. |
| 4,841,527 A | | 6/1989 | Raychaudhuri et al. |
| 4,868,795 A | | 9/1989 | McDavid et al. |
| 4,974,223 A | * | 11/1990 | Ancheta et al. ............. 370/514 |
| 5,012,469 A | | 4/1991 | Sardana |
| 5,121,387 A | | 6/1992 | Gerhardt et al. |
| 5,159,592 A | | 10/1992 | Perkins |
| 5,166,929 A | | 11/1992 | Lo |
| 5,172,375 A | | 12/1992 | Kou |
| 5,216,427 A | | 6/1993 | Yan et al. |
| 5,218,680 A | * | 6/1993 | Farrell et al. ............... 370/458 |
| 5,239,677 A | | 8/1993 | Jasinski |
| 5,276,703 A | | 1/1994 | Budin et al. |
| 5,297,144 A | | 3/1994 | Gilbert et al. |

(List continued on next page.)

Primary Examiner—Kwang Bin Yao
Assistant Examiner—Prenell Jones
(74) Attorney, Agent, or Firm—Knobbe, Martens, Olson & Bear LLP.

(57) ABSTRACT

A system for processing multiple channel buffers in a communication system using multiple processors in a hub station. One embodiment of the invention includes one or more remote units, a satellite in operable communication with the remote units, and a hub station in operable communication with the satellite. The hub station includes a plurality of channel buffers for storing data that is transmitted from the satellite and a plurality of processors. Each of the processors respectively processes in sequence each of the plurality of channel buffers, and each of the plurality of processors determines with respect to a currently selected channel whether the channel has a sufficient amount of databits to process. The determining step includes determining a current time, determining a previous point in time in which the databits have been processed, and determining whether the difference in time between the current time and the previous point in time is above a predefined threshold. Each of the processors process the databits upon the determination that their respective channel has a sufficient amount of databits to process. After determining that a sufficient amount of databits are present, each of the processors atomically updates a last processed time entry that is maintained in a table by the hub station with respect to each of the channel buffers, thereby indicating to the other processors that the databits of that particular channel have been processed.

11 Claims, 5 Drawing Sheets

U.S. PATENT DOCUMENTS

| | | |
|---|---|---|
| 5,345,583 A | 9/1994 | Davis |
| 5,381,443 A | 1/1995 | Borth et al. |
| 5,384,777 A | 1/1995 | Ahmadi et al. |
| 5,420,864 A | 5/1995 | Dahlin et al. |
| 5,448,706 A * | 9/1995 | Fleming et al. ............. 711/217 |
| 5,471,473 A | 11/1995 | Tejima |
| 5,485,464 A | 1/1996 | Strodtbeck et al. |
| 5,490,087 A | 2/1996 | Redden et al. |
| 5,537,397 A | 7/1996 | Abramson |
| 5,539,730 A | 7/1996 | Dent |
| 5,541,924 A | 7/1996 | Tran et al. |
| 5,550,992 A | 8/1996 | Hashimoto |
| 5,566,168 A | 10/1996 | Dent |
| 5,570,355 A | 10/1996 | Dail et al. |
| 5,577,024 A | 11/1996 | Malkamaki et al. |
| 5,586,121 A | 12/1996 | Moura et al. |
| 5,596,581 A * | 1/1997 | Saeijs et al. ................ 370/394 |
| 5,612,703 A | 3/1997 | Mallinckrodt |
| 5,613,195 A | 3/1997 | Ooi |
| 5,615,212 A | 3/1997 | Ruszczyk et al. |
| 5,621,752 A * | 4/1997 | Antonio et al. ............. 375/200 |
| 5,638,361 A | 6/1997 | Ohlson et al. |
| 5,642,354 A | 6/1997 | Spear |
| 5,644,576 A | 7/1997 | Bauchot et al. |
| 5,651,009 A | 7/1997 | Perreault et al. |
| 5,652,892 A | 7/1997 | Ugajin |
| 5,673,322 A | 9/1997 | Pepe et al. |
| 5,677,909 A | 10/1997 | Heide |
| 5,678,208 A | 10/1997 | Kowalewski et al. |
| 5,696,903 A | 12/1997 | Mahany |
| 5,704,038 A | 12/1997 | Mueller et al. |
| 5,706,278 A | 1/1998 | Robillard et al. |
| 5,719,867 A * | 2/1998 | Borazjani ................... 370/436 |
| 5,732,328 A | 3/1998 | Mitra et al. |
| 5,734,833 A | 3/1998 | Chiu et al. |
| 5,745,485 A | 4/1998 | Abramson |
| 5,758,088 A | 5/1998 | Bezaire et al. |
| 5,768,254 A | 6/1998 | Papadopoulos et al. |
| 5,774,467 A * | 6/1998 | Herrera Van Der Nood et al. ......................... 370/428 |
| 5,790,533 A | 8/1998 | Burke et al. |
| 5,790,535 A | 8/1998 | Kou |
| 5,790,551 A | 8/1998 | Chan |
| 5,790,939 A | 8/1998 | Malcolm et al. |
| 5,790,940 A | 8/1998 | Laborde et al. |
| 5,796,726 A | 8/1998 | Hassan et al. |
| 5,802,061 A | 9/1998 | Agarwal |
| 5,809,093 A | 9/1998 | Cooper |
| 5,809,400 A | 9/1998 | Abramsky et al. |
| 5,809,414 A | 9/1998 | Coverdale et al. |
| 5,815,652 A | 9/1998 | Ote et al. |
| 5,815,798 A | 9/1998 | Bhagalia et al. |
| 5,818,831 A | 10/1998 | Otonari |
| 5,818,845 A | 10/1998 | Moura et al. |
| 5,818,887 A | 10/1998 | Sexton et al. |
| 5,822,311 A | 10/1998 | Hassan et al. |
| 5,828,655 A | 10/1998 | Moura et al. |
| 5,848,064 A | 12/1998 | Cowan |
| 5,859,852 A | 1/1999 | Moura et al. |
| 5,862,452 A | 1/1999 | Cudak et al. |
| 5,872,820 A | 2/1999 | Upadrasta |
| 5,887,187 A * | 3/1999 | Rostoker et al. ............... 712/29 |
| 5,889,766 A | 3/1999 | Ohnishi et al. |
| 5,905,719 A | 5/1999 | Arnold et al. |
| 5,909,447 A | 6/1999 | Cox et al. |
| 5,910,945 A | 6/1999 | Garrison et al. |
| 5,915,207 A | 6/1999 | Dao et al. |
| 5,926,458 A | 7/1999 | Yin |
| 5,946,602 A | 8/1999 | Sayegh |
| 5,958,018 A | 9/1999 | Eng et al. |
| 5,959,982 A | 9/1999 | Federkins et al. |
| 5,960,001 A | 9/1999 | Shaffer et al. |
| 5,963,557 A | 10/1999 | Eng |
| 5,966,412 A | 10/1999 | Ramaswamy |
| 5,966,636 A | 10/1999 | Corrigan et al. |
| 5,970,069 A * | 10/1999 | Kumar et al. ................ 370/402 |
| 6,021,124 A * | 2/2000 | Haartsen ..................... 370/336 |

* cited by examiner

SYSTEM AND METHOD FOR CLOCK CORRELATED DATA FLOW IN A MULTI-PROCESSOR COMMUNICATION SYSTEM

RELATED APPLICATION

The present application is related to co-pending U.S. application Ser. No. 09/407589, entitled SYSTEM AND METHOD FOR TASK COORDINATION IN A MULTI-PROCESSOR COMMUNICATION SYSTEM, filed Sep. 28, 1999.

BACKGROUND OF THE INVENTION

I. Field of the Invention

This invention relates generally to communication systems. More specifically, the invention relates to a communication system having multiple processors to process data.

II. Description of the Related Art

The use of wireless communication systems for the transmission of digital data is becoming more and more pervasive. In a typical wireless system, a digital data network is connected to a plurality or remote units via a hub station and satellite. The satellite receives signals from the remote units and forwards them to the hub station. The hub station then transmits the signals to the digital data network. The path from the remote units to the digital network is referred to as a reverse link.

According to the prior art, each processor in the hub station is assigned to service a fixed group of channel buffers. In order to prevent overflow of the channel buffers, the processing resources of the processor assigned to a group of channel buffers must exceed the worst case expected processing demands of the group of channel buffers. However, by providing a processor which has more processing resources than the worst case processing demand of the group of channel buffers to which it is assigned, some of the processor's resources will remain unutilized at all times. When as the number of groups of channels increases, the unutilized processor resources increases proportionately. In some cases, the cumulative unutilized processing resources in a system can exceed the processing resources provided by multiple processors.

For example, in a system in which the worst case processing demands of a group of 3 channel buffers is 2.1 Mega-instructions per second and the processor assigned to service the group of channel buffers is 2.5 Mega-instructions per second, 400 kila-instuctions per second of the processor's resources remain unutilized at all times. If the same system has 300 channel buffers, 100 processors are used to service 100 groups of channels. In such a case, the cumulative unutilized processing resource is 40 Mega-instructions per second or the equivalent processing power of about 16 processors. Such extravagant under-utilization of processing resources increases the cost, power consumption, size and heat dissipation requirements of the system.

Therefore, there is a need for a system and method of reducing the amount of un-utilized processing power that are present in the hub station, yet ensuring that data communications being routed through the hub station are handled in a timely manner.

SUMMARY

One embodiment of the invention includes a system comprising a communication system, comprising at least one remote unit, a satellite in operable communication with the at least one remote unit, a hub station in operable communication with the satellite, the hub station comprising a plurality of channel buffers for storing databits received from the satellite at the hub station, each of the channel buffers having an associated last-processed time, and a plurality of processors, wherein each of the processors respectively analyzes each of the plurality of channel buffers, and wherein each of the plurality of processors determines with respect to a currently selected channel buffer whether the currently selected channel buffer has sufficient amount of databits to process, the determining comprising determining a current time, and determining whether the difference in time between the current time and the last-processed time associated with the currently selected channel buffer is greater than a threshold, and wherein each of the processors processes the databits upon the determination that the currently selected channel buffer for the processor has a sufficient amount of databits to process, and wherein the each of the processors determines whether the databits have been processed by another one of the processors by performing a compare/exchange command with respect to the last-processed time that is associated with the selected channel buffer.

Another embodiment of the invention includes a method of identifying one or more databits for processing in a communication system, the method comprising successively storing one or more databits in a channel buffer, wherein the databits collectively comprise a data stream, determining a data rate for the data stream, determining a start location in the channel buffer, the art of determining based at least in part upon the data rate, a last-processed time that is associated with the channel buffer, and the size of the channel buffer, and determining an end location in the channel buffer.

Yet another embodiment of the invention includes a system for identifying one or more databits for processing in a communication system, the system comprising means for successively storing one or more databits in a channel buffer, wherein the databits collectively comprise a data stream, means for determining a data rate for the data stream, means for determining a start location in the channel buffer, the determining means acting based at least in part upon the data rate, a last-processed time that is associated with the channel buffer, and the size of the channel buffer, and means for determining an end location in the channel buffer.

BRIEF DESCRIPTION OF THE DRAWINGS

The features, objectives, and advantages of the invention will become more apparent from the detailed description set forth below when taken in conjunction with the drawings wherein like parts are identified with like reference numerals throughout and wherein.

DETAILED DESCRIPTION OF THE INVENTION

The following detailed description is directed to certain specific embodiments of the invention. However, the invention can be embodied in a multitude of different ways as defined and covered by the claims.

Figure 1:
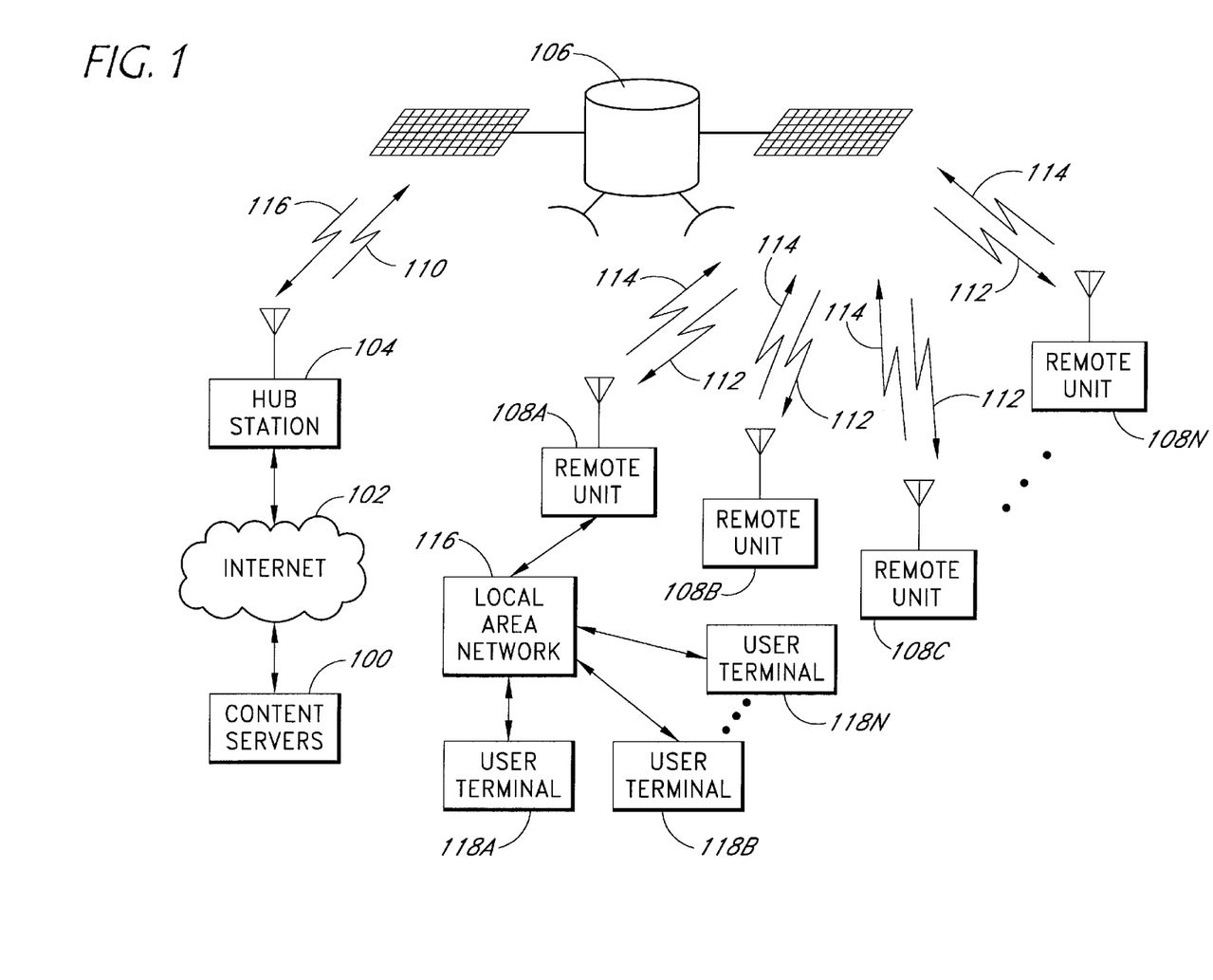
FIG. 1 is a block diagram illustrating a communication system including a hub station, a satellite, and an Internet.

FIG. 1 is a block diagram illustrating an exemplifying system in which the invention may be embodied. The system in FIG. 1 provides high-speed, reliable Internet communication service over a satellite link.

In particular, in FIG. 1, content servers 100 are coupled to the Internet 102 which is in turn coupled to a hub station 104 such that the hub station 104 can request and receive digital data from the content servers 100. The hub station 104 also communicates via satellite 106 with a plurality of remote units 108–108N. For example, the hub station 104 transmits signals over a forward uplink 110 to the satellite 106. The satellite 106 receives the signals from the forward uplink 110 and re-transmits them on a forward downlink 112. Together, the forward uplink 110 and the forward downlink 112 are referred to as the forward link. The remote units 108–108N monitor one or more channels which comprise the forward link in order to receive remote-unit-specific and broadcast messages from the hub station 104.

In a similar manner, the remote units 108–108N transmit signals over a reverse uplink 114 to the satellite 106. The satellite 106 receives the signals from the reverse uplink 114 and re-transmits them on a reverse downlink 116. Together, the reverse uplink 114 and the reverse downlink 116 are referred to as the reverse link. The hub station 104 monitors one or more channels which comprise the reverse link in order to extract messages from the remote units 108–108N. For example, in one embodiment of the system 150, the reverse link carries multiple access channels as described in assignee's co-pending application entitled METHOD AND APPARATUS FOR MULTIPLE ACCESS IN A COMMUNICATION SYSTEM, application Ser. No. 09/407,639, filed concurrently herewith, the entirety of which is hereby incorporated by reference.

In one embodiment of the exemplifying system, each remote unit 108–108N is coupled to a plurality of system users. For example, in FIG. 1, the remote unit 108A is shown as coupled to a local area network 116 which in turn is coupled to a group of user terminals 118A–118N. The user terminals 118A–118N may be one of many types of local area network nodes such as a personal or network computer, a printer, digital meter reading equipment or the like. When a message is received over the forward link intended for one of the user terminals 118A–118N, the remote unit 108A forwards it to the appropriate user terminal 118 over the local area network 116. Likewise, the user terminals 118A–118N can transmit messages to the remote unit 108A over the local area network 116.

In one embodiment of the exemplifying system, the remote units 108–108N provide Internet service to a plurality of users. For example, assume that the user terminal 118A is a personal computer which executes browser software in order to access the World Wide Web. When the browser receives a request for a web page or embedded object from the user, the user terminal 118A creates a request message according to well-known techniques. The user terminal 118A forwards the request message over the local area network 116 to the remote unit 108A, also using wellknown techniques. Based upon the request message, the remote unit 108A creates and transmits a wireless link request over a channel within the reverse uplink 114 and the reverse downlink 116. The hub station 104 receives the wireless link request over the reverse link. Based upon the wireless link request, the hub station 104 passes a request message to the appropriate content server 100 over the Internet 102.

In response, the content server 100 forwards the requested page or object to the hub station 104 over the Internet 102. The hub station 104 receives the requested page or object and creates a wireless link response. The hub station transmits the wireless link response over a channel within the forward uplink 110 and forward downlink 112. For example, in one embodiment of the exemplifying system, the hub station 104 creates and sends the wireless link response in accordance with assignee's co-pending U.S. patent application Ser. No. 09/407,646, entitled TRANSMISSION OF TCP/IP DATA OVER A WIRELESS COMMUNICATION CHANNEL, filed Sept. 28, 1999, and assignee's co-pending U.S. patent application Ser. No. 09/407645, entitled METHOD AND SYSTEM FOR FREQUENCY SPECTRUM RESOURCE ALLOCATION, filed Sept. 28, 1999, each of which is filed concurrently herewith and the entireties of which are hereby incorporated by reference.

The remote unit 108A receives the wireless link response and forwards a corresponding response message to the user terminal 118 over the local area network 116. In one embodiment of the exemplifying system, the process of retrieving a web page or object is executed in accordance with assignee's co-pending application entitled DISTRIBUTED SYSTEM AND METHOD FOR PREFETCHING OBJECTS, application Ser. No. 09/129,142, filed Aug. 5, 1998, the entirety of which is hereby incorporated by reference. In this way, a bi-directional link between the user terminal 118A and the content servers 100 is established.

Figure 2:
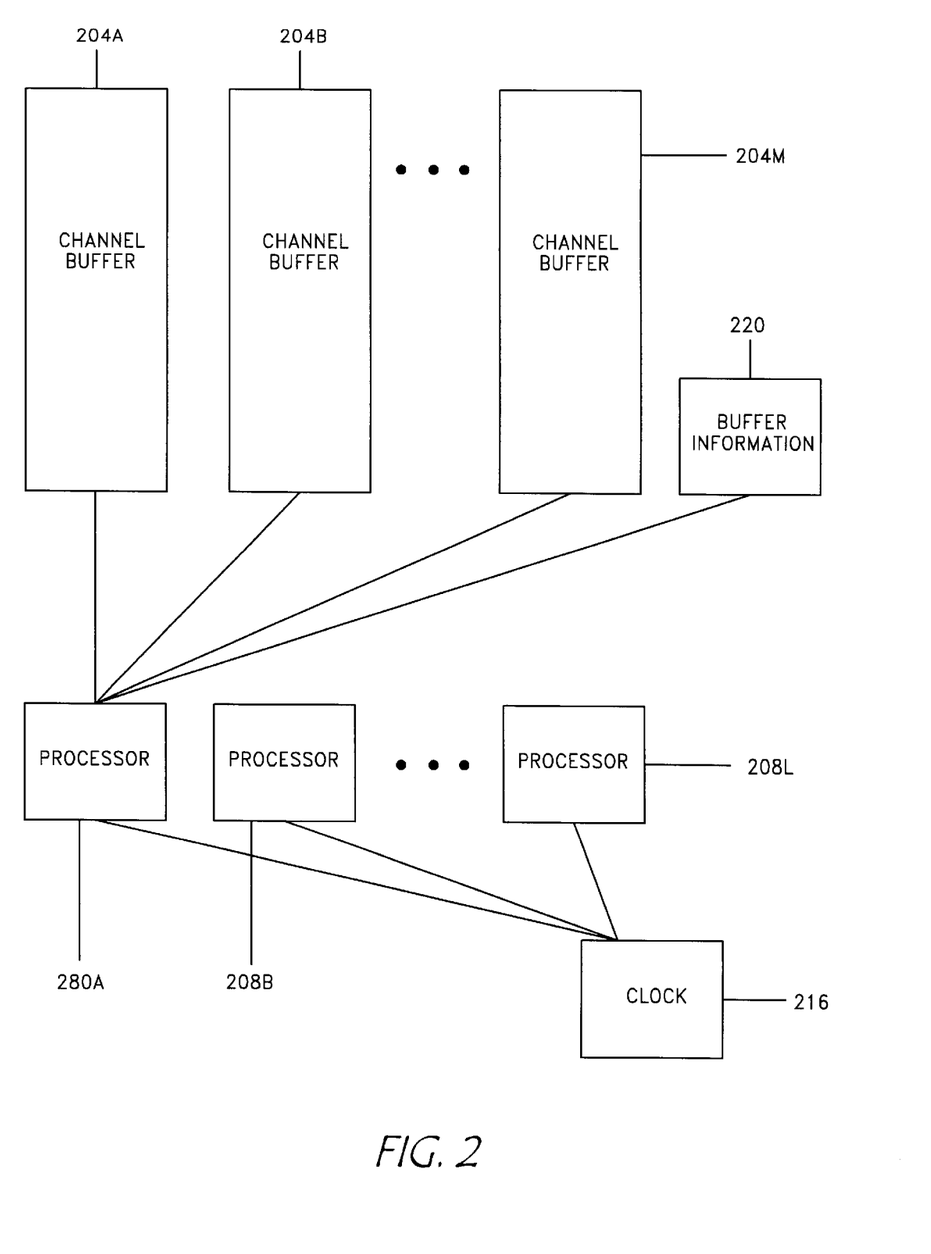
FIG. 2 is a block diagram illustrating one embodiment of the hub station of FIG. 1, the hub station including a plurality of processors, a plurality of channel buffers, and channel information.

FIG. 2 is a block diagram illustrating selected components of the hub station 104 (FIG. 1). The hub station 104 includes a plurality of channel buffers 204A–204M that are in operable connection with processors 208A–208L. The processors 208A–208L process data from the channel buffers 204A–204M after it has been stored in the channel buffers 204A–204M. In one embodiment of the invention, each of the processors 208A–208L processes data in groups of a predetermined size referred to as processing blocks. Each of the processors 208A–208L analyzes one of the channel buffers 204A–204M to determine if a complete processing block has been received, and, if so, processes the processing block. If a processing block has not been received, the processors 208A–208L analyze another one of the channel buffers 204A–204M to determine if a complete processing block has been received.

In one embodiment of the invention, each of the channel buffers 204A–204M is a circular register having a plurality of memory locations. In this embodiment, as data is received by the hub station 104, it is stored in successive memory locations of the channel buffer until the channel buffer is full. In this instance, the contents of the memory that were first received are overwritten and replaced by new data that is received by the hub station 104. In order to prevent overflow, the data in the channel buffers must be processed by one of the processors 208A–208L before it is over written. In one embodiment, the channel buffers 204A–204M are capable of storing between one and two processing blocks worth of data. In one embodiment of the invention, each of the channel buffers 204A–204M can store identical amounts of data. In another embodiment of the invention, selected ones or all of the channel buffers 204A–204M are of varied length with respect to each other.

Although only three channel buffers and only three processors are shown in FIG. 2, the number of channel buffers and processors and the ratio of channel buffers to processors can be increased or decreased depending on the type of data that is to be received, the speed of the processors, and the size of the channel buffers. For example, the number of processors 208A–208L in the hub station 104 can range anywhere between 1 and 100 and upwards. Further, the number of channel buffers 204A–204M in the hub station 104 can range anywhere between 1 and 100 and upwards.

None of the processors 208A–208L is assigned to a specific channel buffer 204A–204M and each of the processors 208A–208L is coupled to and capable of servicing each of the channel buffers 204A–204M. In one embodiment of the invention, each of the channel buffers 204A–204M is logically arranged in a predefined order. The predefined selection process identifies for a respective processor the next channel buffer 204 to be analyzed when the processor finishes its current task.

Each of the processors 208A–208L are operably connected to a clock 216 and buffer information 220. The buffer information 220 maintains various items of information to assist the processors 208A–208L in processing the data in the channel buffers 204A–204M.

Figure 3:
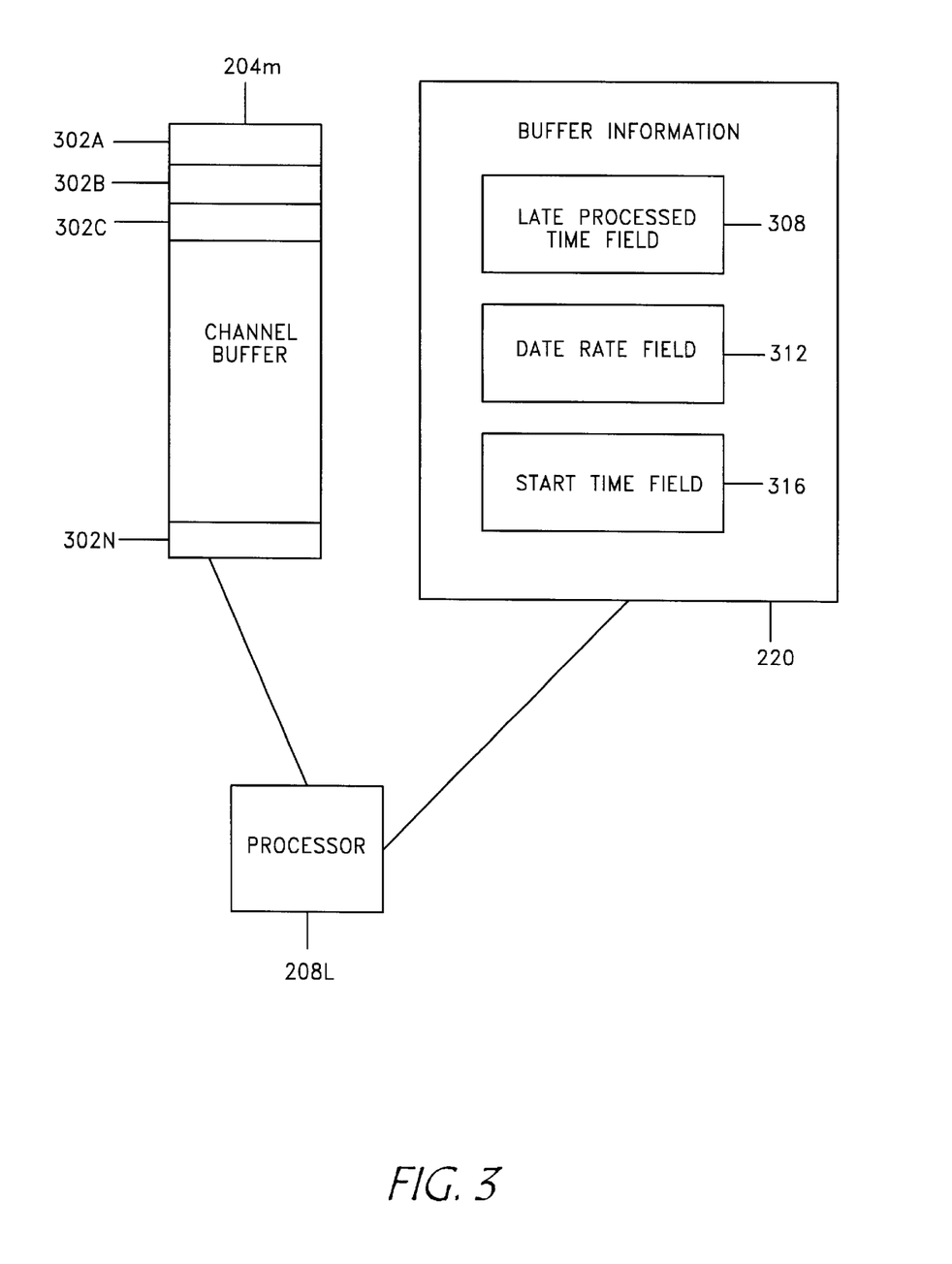
FIG. 3 is a block diagram illustrating the data fields that are included in the channel information of FIG. 2.

FIG. 3 is a block diagram illustrating in further detail the components of the buffer information 220 and the channel buffer 204A. The channel buffers 204A–204M include a plurality of locations 302A–302N, each of the locations being adapted to hold an element of data. In one embodiment of the invention, each element of data is one bit in length. In another embodiment of the invention, each element of data is a byte in length. It is to be appreciated that other lengths may be used.

The buffer information 220 includes a last-processed time field 308, a data rate field 312, and a start time field 316 corresponding to each of the channel buffers 204A–204M. The last-processed time field 308 indicates the time corresponding to the last databit in the channel buffer 204A that was processed or similarly, the start time of the current processing block being stored. The data rate field 312 indicates the rate at which data is received by the channel buffers 204A–204M. In one embodiment of the invention, each of the channel buffers 204A–204M receives data at a constant rate. In another embodiment, each of the channel buffers 204A–204M is configured to receive data at a plurality of rates. The start time field 316 identifies the time at which the respective channel began to store data.

In one embodiment of the invention, the values for the last-processed time field 308, the data rate field 312, and the start time field 316 are independently maintained with respect to each of the channel buffers 204A–204M. However, it should be appreciated that selected items of the buffer information, depending on the embodiment, may be used to reflect information for more than one or all of the channel buffers 204A–204M. For example, it is to be appreciated that the data rate may be applicable to more than one of the channel buffers 204A–204M.

Figure 4A:
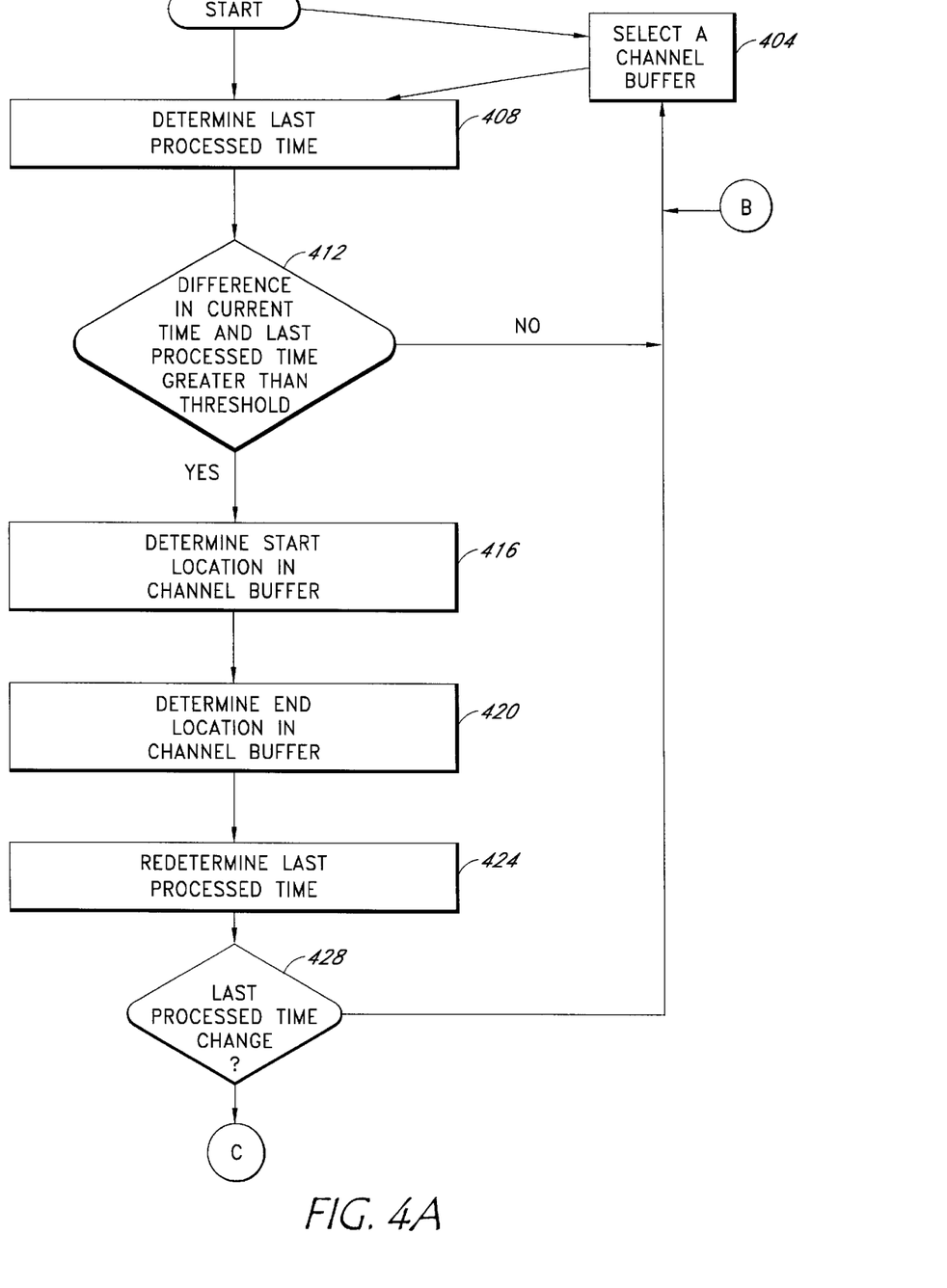
FIGS. 4A and 4B are collectively a flowchart illustrating a process which is performed by each of the processors of FIG. 2 with reference to the channel buffers of FIG. 2.
Figure 4B:
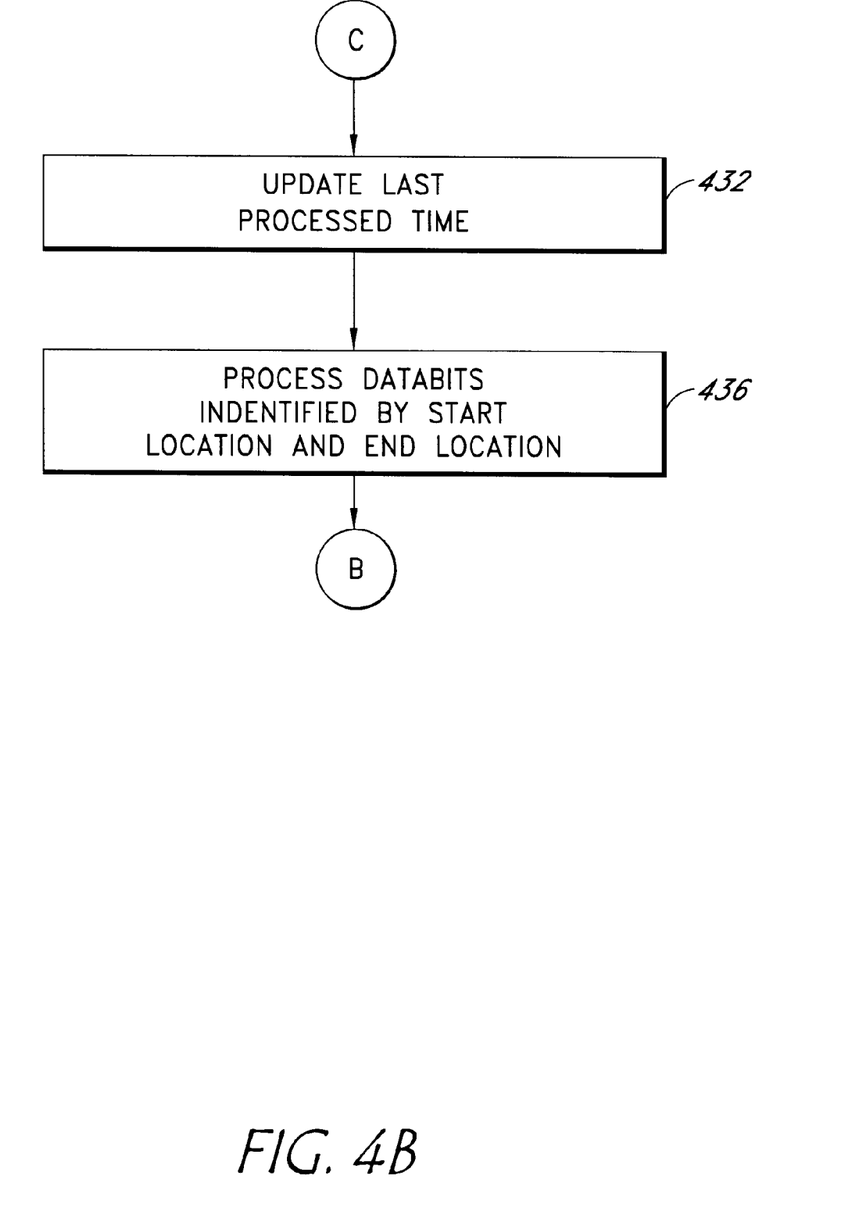

FIGS. 4A and 4B are collectively a flowchart illustrating a process by which each of the processors 208A–208L (FIG. 2) process the databits that are successively stored in the channel buffers 204A–204M. It is noted that each of the databits is collectively referred to as a data stream. For convenience of description, the following description describes the processing process which is performed with respect to the processor 208A. However, it should be appreciated that each of the processors 208B–208L perform the same or a similar process.

Starting at a step 404, the processor 208A (FIG. 2) selects one of the channel buffers 204A–204M (FIG. 2) according to a predefined selection process. As was discussed further above, the selection process defines a processing sequence with respect to the processor 208A and each of the channel buffers 204A–204M.

Moving to a step 408, the processor 208A (FIG. 2) determines a last-processed time with respect to the selected channel buffer. The last-processed time can be retrieved from the last-processed time field 308 (FIG. 3) which is maintained in the buffer information 220.

Continuing to a decision step 412, the processor 208A determines whether the difference in between the current time and last-processed time (determined in the step 408) is greater than a threshold. The threshold is determined based on the data rate and processing block size and may be fixed or variable. At the decision step 412, the processor 208A uses the determination to know whether a complete processing block of data is stored in the selected channel buffer. If an insufficient amount of databits have been received by the processor 208A, the processor 208A is unable to process the data.

Still referring to the decision step 412, if the difference in the current time and the last-processed time is less than or equal to the threshold, the processor 208A (FIG. 2) knows that an insufficient amount of data has accumulated in the selected channel buffer and returns to the step 404 to select a different one of the channel buffers 204A–204M (FIG. 2). However, if the difference in the current time and the last proceed time is greater than the threshold, the processor 208A proceeds to a step 416.

At the step 416, the processor 208A determines a start location in the selected channel buffer. The start location identifies a data element, such as a data bit, within the selected channel buffer that is the first data element within the processing block available for processing. In one embodiment of the invention, the processor determines the start location using Equation 1.

$$\text{start\_loc} = \text{size\_buf} \text{ MODULO } ((\text{last\_processed\_time} - \text{start\_time}) * \text{data\_rate}) \quad \text{Eq. 1}$$

wherein:

size_buf is the size of the selected channel;

last_processed_time is the time identified by the last processed time field 308;

start_time is the time identified by the start time field 316; and data_rate is the rate identified by the data rate field 312.

Next, at a step 420, the processor 208A determines an end location in the processing block. In one embodiment of the invention, the end location is determined by first calculating the total amount of databits that have been received by the selected channel. In this embodiment, the last received location is calculated by the Equation 2.

$$\text{last\_received} = \text{size\_buf} \text{ MODULO } ((\text{current\_time} - \text{start\_time}) * \text{data\_rate}) \quad \text{Eq. 2}$$

wherein:

current_time is the current time according to the clock 216.

In another embodiment, the last received location is determined by the modulo addition of the processing block size and the start location. The processor 208A then sets the end location to reference the end of the last bit in the block.

Moving to a decision step 428, the processor 208A determines whether the last-processed time identified by the last-processed time field 308 has changed. In the time it took for the processor 208A to identify the start and end locations of the processing block to be processed, another one of the processors 208B–208L may have begun processing the block. Accordingly, the processor 208A reads the last-processed time from the last processing time field 308 to determine whether it has been updated by another one of the processors 208B–208L.

If the last-processed time has been modified, the processor 208A assumes another one of the processors 208B–208L has begun processing the data and returns to the step 404 to select another channel for processing. However, if the last processing time has not been modified, the processor 208A assumes that the data is still in need of processing and proceeds to a step 432. At the step 432, the processor 208A atomically updates the last-processed time field to reflect the start time of the next block being stored in the channel buffer. For example, the value in the last-processed time field is increased by the reception time corresponding to one processing block. In one embodiment of the invention, the steps 428 and 432 are performed using a predefined processing instruction. For example, the processor 208A sends a "compare/exchange command" which logically says "if the contents of the buffer is XX, change it to YY and return an indicator as to whether a change was made."

Continuing to a step 436, the processor 208A processes the databits identified by the start and end locations. The processor 208A then returns to the step 404 to select another one of the channel buffers 204A–204M for processing.

Advantageously, the processing system of the present invention allows multiple processors to share the processing of several channel buffers. Using the processing system of the present invention, it is possible to have improper fraction processor to channel buffers ratios such as 2:3, 2:5, 2:7, 3:4, 3:5, etc. wherein the workload associated with each of the channel buffers is evenly distributed amongst each of the processors. Further, given a number of channel buffers and corresponding processing demand, the present invention, depending on the embodiment, may reduce the number of processors that are required to service the channel buffers.

For example, assume the hub station 104 of the present invention includes two processors which can successfully service the demands of three channel buffers. However, in contrast, if a prior art communication system required a one to one or a one to many relationship between the processors and channel buffers, then either (i) one processor must be used for three of the channel buffers, (ii) two processors must be used but would require one processor to be dedicated to two of the channel buffers and the other processor to be dedicated to the remaining channel buffer, or (iii) three processors must be provided, one processor for each of the channel buffers. In the first alternative, the single processor may become overloaded and be unable to process each of the channel buffers. In the second alternative, one of the processors has twice the number of channel buffers to process as the other and a similar result may occur as in the first alternative. In the third alternative, three processors are used which is more costly than two processors.

Accordingly, the present communication system overcomes these limitations by allowing multiple processors to share the processing of multiple channel buffers. The communication system coordinates the work with respect to each of the processors 208A–208L and ensures that the same data is not processed twice.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A communication system, comprising:
at least one remote unit;
a satellite in operable communication with the at least one remote unit;
a hub station in operable communication with the satellite, the hub station comprising:
a plurality of channel buffers for storing databits received from the satellite at the hub station, each of the channel buffers having an associated last-processed time; and
a plurality of processors, wherein each of the processors respectively analyzes each of the plurality of channel buffers, and wherein each of the plurality of processors determines with respect to a currently selected channel buffer whether the currently selected channel buffer has sufficient amount of databits to process, the determining comprising:
determining a current time, and
determining whether the difference in time between the current time and the last-processed time associated with the currently selected channel buffer is greater than a threshold, and
wherein each of the processors processes the databits upon the determination that the currently selected channel buffer for the processor has a sufficient amount of databits to process, and wherein the each of the processors determines whether the databits have been processed by another one of the processors by performing a compare/exchange command with respect to the last-processed time that is associated with the selected channel buffer.

2. The method of claim 1, wherein each of the plurality of channel buffers is a circular buffer.

3. A method of identifying one or more databits for processing in a communication system, the method comprising:
successively storing one or more databits in a channel buffer, wherein the databits collectively comprise a data stream;
determining a data rate for the data stream;
determining a start location in the channel buffer, wherein the determining is based at least in part upon the data rate, a last-processed time that is associated with the channel buffer, and the size of the channel buffer; and
determining an end location in the channel buffer.

4. The method of claim 3, additionally comprising processing each of the databits in the channel buffer that are located between the databit identified by the start location and the databit identified by the end location.

5. The method of claim 3, wherein determining the start location includes evaluating the equation:

$$\text{start\_loc} = \text{size\_buf MODULO} ((\text{last\_processed\_time} - \text{start\_time}) * \text{data\_rate}),$$

wherein the variable size\_buf corresponds to the size of the channel buffer,
wherein the variable last\_processed\_time corresponds to the time that the channel buffer was last processed,
wherein the variable start\_time corresponds to the time that the channel buffer began to receive the databits, and wherein the variable data rate corresponds to the rate at which data is received by the channel buffer.

6. A method of determining the availability of one or more databits for processing, the method comprising:

successively receiving one or more databits; and periodically analyzing the databits, the act of periodically analyzing comprising:
        determining a current time,
        determining a previous point in time at which the databits were processed, and
        determining whether the difference in time between the current time and the previous point in time is above a predefined threshold.

7. The method of claim 6, additionally including processing one or more of the databits that have not been previously processed.

8. A system for identifying one or more databits for processing in a communication system, the system comprising:

means for successively storing one or more databits in a channel buffer, wherein the databits collectively comprise a data stream;

means for determining a data rate for the data stream;

means for determining a start location in the channel buffer, wherein to determine the start location the determining means uses at least in part upon the data rate, a last-processed time that is associated with the channel buffer, and the size of the channel buffer; and     means for determining an end location in the channel buffer.

9. The system of claim 8, additionally comprising means for processing each of the databits position in the channel buffer that are located between the data element identified by the start location and the data element identified by the end location.

10. A system for determining the availability of one or more databits for processing, the system comprising:

means for successively receiving one or more databits; and     means for periodically analyzing the databits, the periodically analyzing means comprising:
        means for determining a current time,
        means for determining a previous point in time in which the databits have been processed, and
        means for determining whether the difference in time between the current time and the previous point in time is above a predefined threshold.

11. A communication system, comprising:

a plurality of channel buffers for storing data bits; and a plurality of processors which each respectively analyzes in sequence each of the plurality of channel buffers, each of the plurality of processors determining with respect to a selected one of the channel buffers whether the channel buffer has a sufficient amount of databits to process, the determining comprising:

determining a current time;

determining a previous point in time in which the databits have been processed; and determining whether the difference in time between the current time and the previous point in time is above a predefined threshold.

\* \* \* \* \*